United States Patent
Laurent (10) Patent No.: US 9,795,919 B2
(45) Date of Patent: Oct. 24, 2017

(54) RECYCLING OF WASTE HEAT BY DEHUMIDIFIER APPLIANCE: APPARATUS AND METHOD

(71) Applicant: 2525 GROUP, INC., Plymouth, MN (US)

(72) Inventor: Robert A. Laurent, Plymouth, MN (US)

(73) Assignee: 2525 Group, Inc., Plymouth, MN (US)

( * ) Notice: Subject to any disclaimer, the term of this patent is extended or adjusted under 35 U.S.C. 154(b) by 0 days.

(21) Appl. No.: 15/030,696

(22) PCT Filed: Mar. 18, 2015

(86) PCT No.: PCT/US2015/021149
§ 371 (c)(1),
(2) Date: Apr. 20, 2016

(87) PCT Pub. No.: WO2015/142983
PCT Pub. Date: Sep. 24, 2015

(65) Prior Publication Data
US 2017/0232382 A1    Aug. 17, 2017

Related U.S. Application Data

(60) Provisional application No. 61/968,590, filed on Mar. 21, 2014.

(51) Int. Cl.
| | |
|---|---|
| *B01D 53/26* | (2006.01) |
| *F24F 3/00* | (2006.01) |
| *B01D 53/06* | (2006.01) |
| *F24F 3/14* | (2006.01) |
| *F24F 12/00* | (2006.01) |

(52) U.S. Cl.
CPC ........... *B01D 53/261* (2013.01); *B01D 53/06* (2013.01); *F24F 3/1423* (2013.01); *F24F 12/00* (2013.01); *B01D 2257/80* (2013.01); *F24F 2203/1032* (2013.01)

(58) Field of Classification Search
CPC .. B01D 53/0462; B01D 53/06; B01D 53/261; B01D 2257/80; B01D 2259/4009; B01D 2259/40098; F24F 3/1423; F24F 12/00; F24F 2203/1032
USPC ............. 95/14, 18, 113, 114, 117, 123, 126; 96/112, 125, 146; 34/472, 473, 80
See application file for complete search history.

(56) References Cited

U.S. PATENT DOCUMENTS

| | | | | |
|---|---|---|---|---|
| 3,731,458 A | * | 5/1973 | McGrath, Jr. .......... | B01D 53/04 95/123 |
| 4,180,985 A | * | 1/1980 | Northrup, Jr. ......... | B01D 53/26 62/271 |

(Continued)

OTHER PUBLICATIONS

Jun. 17, 2015 PCT Search Report (Serial No. PCT/US15/21149)—Our Matter 5248.

*Primary Examiner* — Frank Lawrence
(74) *Attorney, Agent, or Firm* — Tysver Beck Evans, PLLC (57) ABSTRACT

The present invention is a dehumidifier powered by an engine. The dehumidifier recycles waste heat from the engine and other components for the drying process. Moisture is transferred by advection and evaporation from an air stream flowing through the target environment (e.g., building interior) into a hot system air stream.

23 Claims, 8 Drawing Sheets

(56) References Cited

U.S. PATENT DOCUMENTS

| | | | |
|---|---|---|---|
| 4,622,757 A * | 11/1986 | Bernstein | A23L 3/01 219/681 |
| 6,131,653 A | 10/2000 | Larsson | |
| 6,604,688 B2 | 8/2003 | Ganesh et al. | |
| 7,240,503 B2 | 7/2007 | Kang et al. | |
| 7,251,945 B2 * | 8/2007 | Tongue | B01D 5/0027 62/271 |
| 7,305,840 B2 | 12/2007 | Kang et al. | |
| 7,690,582 B2 | 4/2010 | Matsui et al. | |
| 8,051,637 B2 | 11/2011 | Labrador | |
| 8,067,715 B2 | 11/2011 | Peterson et al. | |
| 8,316,660 B2 | 11/2012 | Demonte et al. | |
| 2002/0040575 A1 * | 4/2002 | Okano | F02C 6/18 60/39.511 |
| 2004/0079102 A1 | 4/2004 | Umebayashi et al. | |
| 2006/0037343 A1 * | 2/2006 | Kang | F24F 3/1423 62/323.1 |
| 2006/0283967 A1 * | 12/2006 | Cho | F24F 3/1423 237/12.1 |
| 2008/0229764 A1 | 9/2008 | Taras et al. | |
| 2009/0205354 A1 | 8/2009 | Brown | |
| 2011/0174000 A1 | 7/2011 | Richter et al. | |
| 2011/0289944 A1 * | 12/2011 | Ouyang | B60H 1/00328 62/61 |
| 2012/0125199 A1 * | 5/2012 | Hess | B01D 53/261 96/146 |
| 2013/0036913 A1 * | 2/2013 | Fukudome | F24F 3/1423 96/118 |
| 2014/0069123 A1 | 3/2014 | Kim | |

* cited by examiner

RECYCLING OF WASTE HEAT BY DEHUMIDIFIER APPLIANCE: APPARATUS AND METHOD

CROSS-REFERENCES TO RELATED APPLICATIONS

This application claims the benefit of U.S. Provisional Application No. 61/968,590, filed Mar. 21, 2014, which is hereby incorporated by reference in its entirety.

FIELD OF THE INVENTION

The present invention relates to the recycling of waste heat from an engine and other system components to reduce the electricity required for a given rate of dehumidification by a dehumidifier.

SUMMARY OF THE INVENTION

The present invention is a dehumidifier powered by an engine, such as an internal combustion engine. The dehumidifier recycles waste heat from the engine and other component for the drying process. Moisture is transferred by advection and evaporation from a target air stream, which flows through a target structure, to be dehumidified into a hot system air stream. The target might be a building or a room. The system air stream, carrying moisture away from the target, is preferably released into the outside environment.

The order in which the system air stream passes over or through components of the system (e.g., generator, engine, radiator, muffler, and exhaust air stream) is selected to maximize heat transfer from these components to the system air stream. Preferably, the temperature to which the system air stream is exposed increases downstream from an exterior air inlet.

The engine produces exhaust, which is released to the outside environment in an exhaust air stream. The sequence in which the system air stream encounters components of the dehumidifier may differ from the sequence in which the exhaust air stream encounters some of the same components.

Adequate cooling of the engine may require more air in the system air stream than is optimal downstream for dehumidification. The dehumidifier may use an air bypass to expel an excess portion of the inflowing system air stream if removing such excess may result in a hotter system air stream and, hence, faster dehumidification. Alternatively, the expelled air from the air bypass might be added to the target air stream, increasing the temperature of the target air stream and thereby speeding drying. The amount of air expelled by an air bypass might be temperature-controlled, it might be manually controlled, or it might be statically in place. A temperature-controlled air bypass may use an engine temperature, which might be an engine surface temperature or engine coolant temperature, to determine the quantity of system air stream air to expel, if any.

The dehumidifier may use one or more air-to-air (A2A) heat exchangers to extract heat from the exhaust air stream into the system air stream. If two A2A heat exchangers are used, preferably hotter exhaust goes through the air-to-air heat exchanger that is further downstream.

The dryer module might be of any type in which moisture from a target air stream is transferred into a system air stream. In a preferred embodiment, moisture is transferred from a target air stream to the system air stream by a rotating disk that contains a hydrophilic substance.

All else being equal, the efficiency of the system allows a significant decrease in size of a dehumidifier capable of achieving a given drying rate. For many commercial, industrial, and home purposes, therefore, the entire system can be packaged and transported within a single housing, with a limited set of interfaces or ports whereby the dehumidifier interacts with the exterior world. The interfaces may include a controller unit, a target air inlet and outlet, a system air inlet and outlet, and a bypass outlet. In some embodiments, there may be an exhaust outlet that is separate from the system air outlet, while in others exhaust might exit the dehumidifier through the system air outlet. In some embodiments, there may be an external fuel inlet. In some embodiments, there may be access to the internal components of the dehumidifier, possibly through a door, a cover, or a hood. In such embodiments, fuel might be added to the system through such access means rather than through an external fuel inlet. The dehumidifier might also include an electrical power outlet, whereby the dehumidifier might also act as an electrical generating system.

DETAILED DESCRIPTION OF EXEMPLARY EMBODIMENTS

This description provides embodiments of the invention intended as exemplary applications. The reader of ordinary skill in the art will realize that the invention has broader scope than the particular examples described here. It should be noted from the outset that the drawings, and the elements depicted by the drawings, may not be to scale. Generally, reference numbers are keyed to the drawing of first appearance. For example, reference number 220 would appear first in FIG. 2; and 460, in FIG. 4. Each such reference will be described at least once, ordinarily in connection with the figure of first appearance. For clarity of the drawings, a given reference number that appears in a second figure will not necessarily be described a second time.

Figure 1:
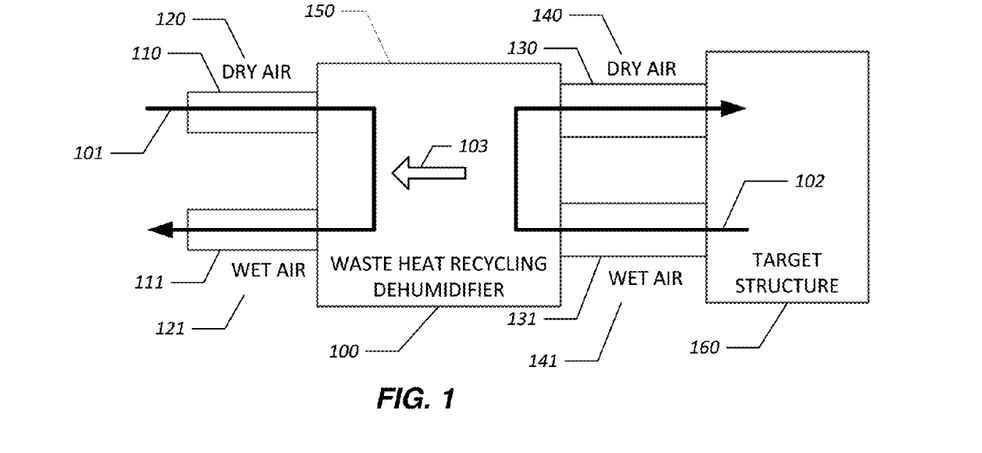
FIG. 1 is a block diagram that illustrates an overview of a waste heat recycling dehumidifier apparatus, and that also illustrates a general method by which it may operate.

FIG. 1 is a block diagram that illustrates an overview of a waste heat recycling dehumidifier (WHRD) 100 apparatus, and that also illustrates the general method by which it operates. The WHRD 100 may be enclosed in a dehumidifier housing 150. A system air stream (SAS) 101 carries dry system air 120 into WHRD 100 through SAS inlet 110. The SAS 101 exits through SAS outlet 111 as wet system air 121. We mean "dry" and "wet" in a relative, not an absolute, sense. The dry system air 120 might be air from outdoors or from indoors, depending upon the situation requiring dehumidification. Concurrently, TAS 102 carries wet target air 141 from a target structure 160 into WHRD 100 through TAS inlet 131. The TAS 102 exits through TAS outlet 130 as dry target air 140. Within WHRD 100, moisture 103 is transferred from TAS 102 to SAS 101.

Figure 2:
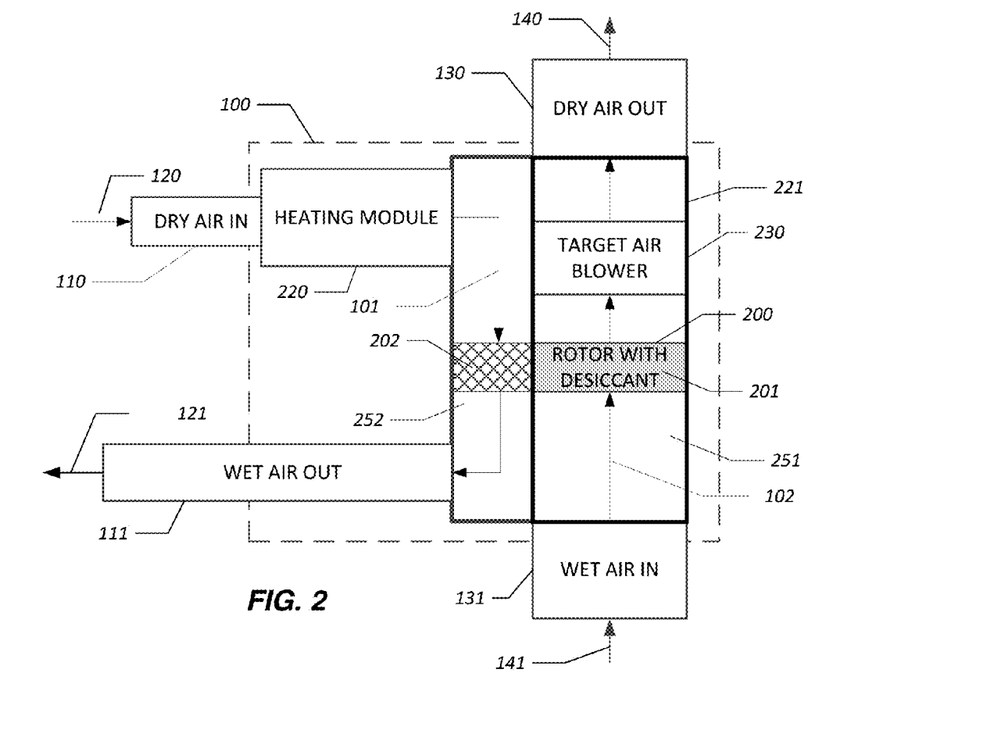
FIG. 2 is a block diagram that illustrates the transfer of moisture from the target air stream to the system (treatment) air stream in a drying module of an exemplary waste heat recycling dehumidifier apparatus and method.

FIG. 2 is a block diagram that illustrates transfer of moisture 103 from TAS 102 to SAS 101 in an exemplary WHRD 100. SAS 101 moves through heating module 220 and into drying module 221. The drying module 221 has two chambers; namely, moisture removal chamber 251, through which TAS 102 moves, and moisture advection chamber 252, through which SAS 101 moves. TAS 102 is forced through drying module 221 of WHRD 100 by target air blower 230. Note that target air blower 230 might be positioned as shown or elsewhere. Within drying module 221, both TAS 102 and SAS 101 are forced through rotor 200, which is where the transfer of moisture 103 occurs. The rotor 200 removes moisture 103 from TAS 102 in moisture advection chamber 252 of rotor 200, and carries it to moisture advection section 202, as will be explained in more detail in reference to FIG. 3a-3b. The rotor 200 includes a disk 300 that either consists of, or includes, a desiccant 301 or other hydrophilic substance. Preferably, this desiccant 301 will be of the solid desiccant type.

Figure 3A:
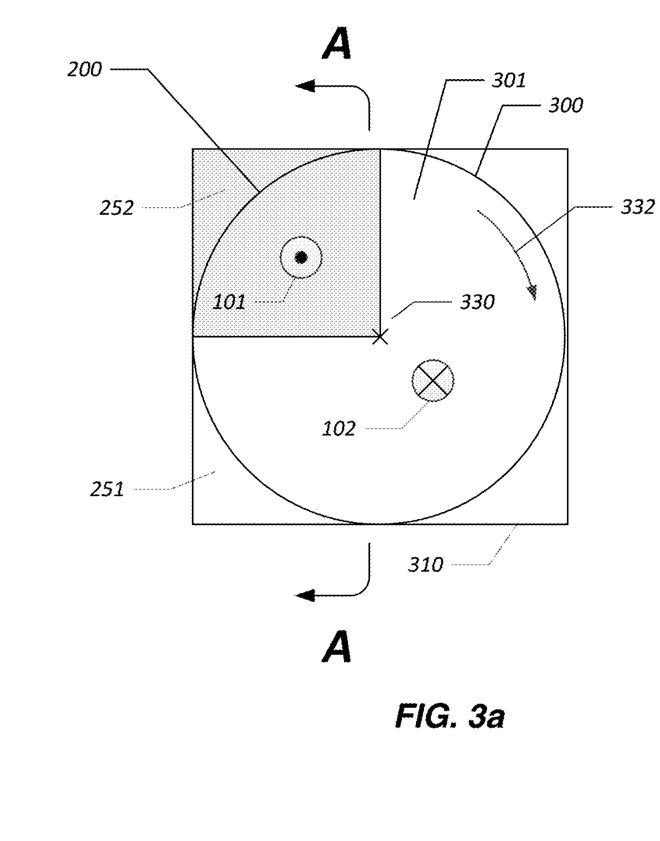
FIG. 3a illustrates a front view of an exemplary rotor used to transfer moisture from the target air stream to the system air stream in an exemplary waste heat recycling dehumidifier apparatus and method.

FIG. 3a illustrates a front view of an exemplary rotor 200 used to transfer moisture 103 from TAS 102 to SAS 101 in an exemplary WHRD 100. The rotor 200 rotates in either direction about axis 330; the particular rotor 200 in FIG. 3a and FIG. 3b rotates clockwise from the perspective of the viewer. TAS 102 flows through the permeable disk 300 within moisture removal chamber 251. Depending upon the particular type of desiccant 301 used, the desiccant 301 either adsorbs (e.g., silica gel or activated clay desiccant) or absorbs (e.g., chemisorbent desiccants, such as calcium oxide) moisture 103, which is carried by the rotating disk 300 into the moisture advection chamber 252. There, the very hot air of SAS 101 causes rapid evaporation into water vapor, which is then advected away and out SAS outlet 111 as wet system air 121.

Figure 3B:
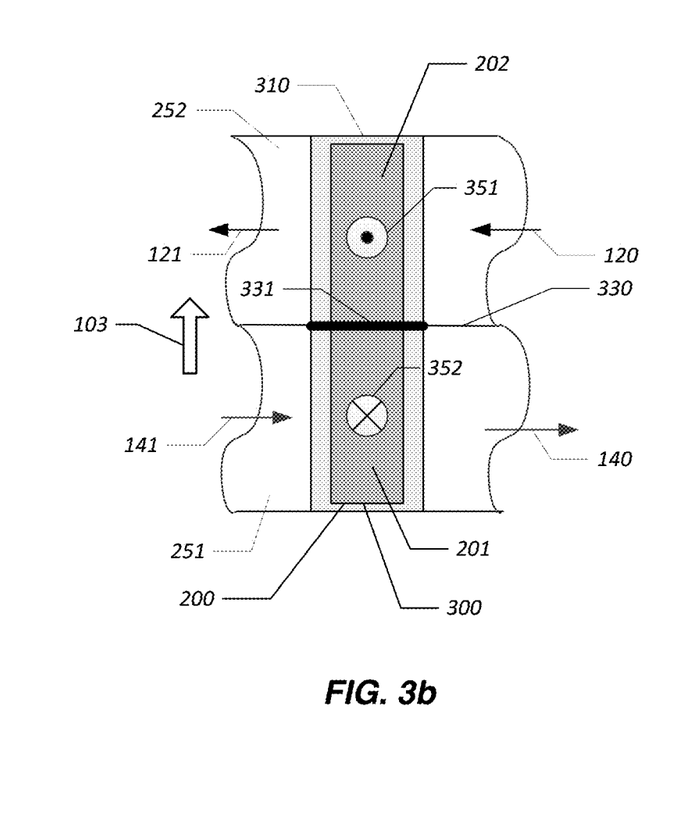
FIG. 3b illustrates a cross-sectional side view of an exemplary rotor used to transfer moisture from the target air stream to the system air stream in an exemplary waste heat recycling dehumidifier apparatus and method, taken through section A-A of the previous figure.

FIG. 3b illustrates a cross-sectional side view of an exemplary rotor 200 in the direction of cross-section A-A of FIG. 3a. Arrows 351 and 352 indicate the rotation of disk 300 on axle 331. SAS 101 enters disk 300 as dry system air 120 and exits as wet system air 121, while TAS 102 enters disk 300 as wet target air 141 and exits as dry target air 140, as moisture 103 is transferred between the two streams.

Figure 4A:
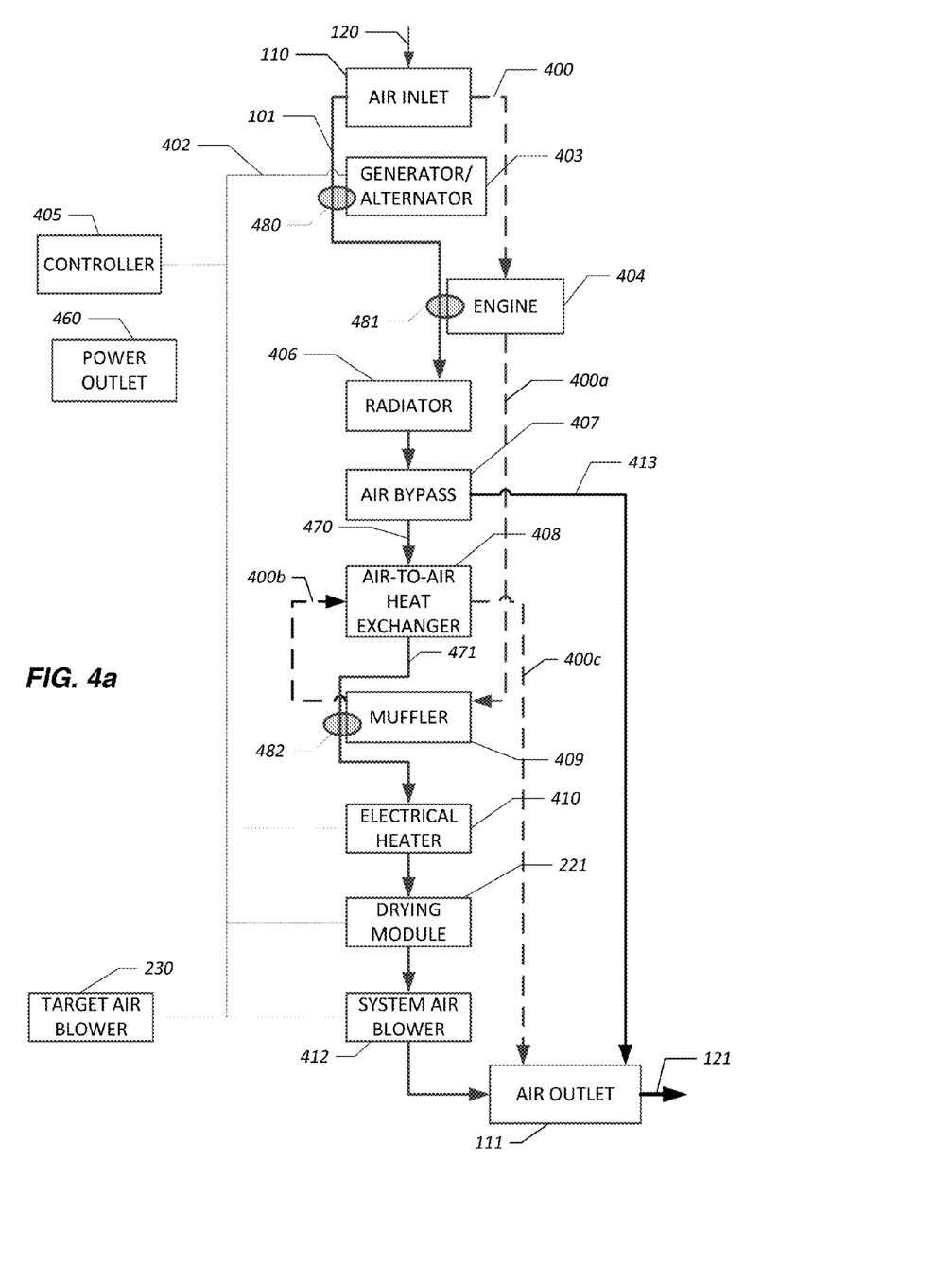
FIG. 4a is a block diagram illustrating an exemplary path of the system air stream relative to components of an exemplary waste heat recycling dehumidifier.

FIG. 4a illustrates an embodiment of SAS 101 in more detail. Air enters through SAS inlet 110. Depending upon application, this might be outside air when, for example, WHRD 100 is being used to dry a target structure 160, or portion of a target structure 160. In other applications, this might be inside air when, for example, WHRD 100 is being used to dry just some area or object within a target structure 160, such as a wet carpet. Entering air is split by ductwork (not shown) into two streams, namely, SAS 101 (solid line arrows) and exhaust air stream (EAS) 400 (dashed line arrows). Because EAS 400 carries particulates and pollutants from engine 404 (e.g., nitric oxide, nitrogen dioxide, carbon monoxide, and/or soot), it is kept separate from TAS 102, which is piped into ambient air of the target structure 160 being dehumidified. A WHRD 100 might have a soot filter or other pollution control device(s) (not shown) with EAS 400.

Note that in some embodiments the electrical heater 410 might be absent. For example, the rotor 200 shown in FIG. 3a is split 75% in the moisture removal chamber 251 and 25% in the moisture advection chamber 252. With some other ratios, such as a 50-50% split, heating from the other system components might allow the electrical heater 410 to be eliminated.

Figure 6A:
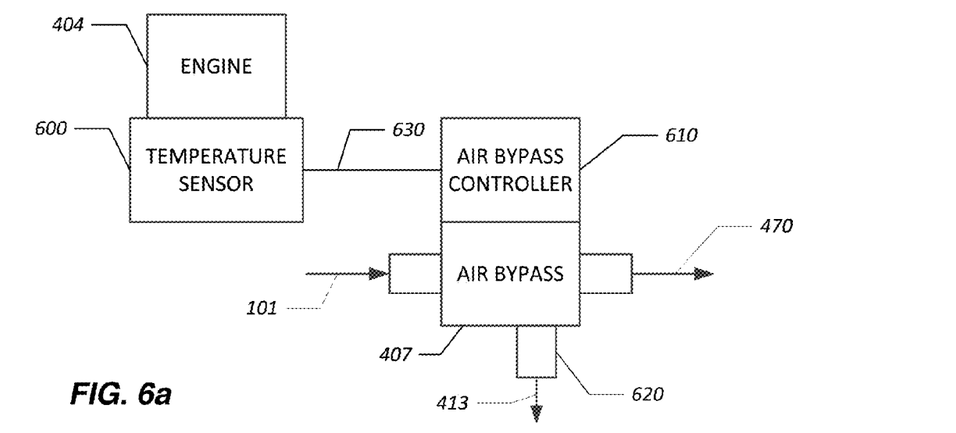
FIG. 6a is a block diagram illustrating the operation of a temperature-controlled air bypass.

The ductwork causes SAS 101 to pass in close proximity to, or in thermal contact with the exterior surfaces of electrical generator/alternator (genAlt) 403 and engine 404, gathering heat from those components. These areas of thermal contact with genAlt 403, engine 404, and muffler 409 are indicated in FIG. 4a by respective gray ovals genAlt heat exchange area 480, engine heat exchange area 481, and muffler heat exchange area 482. For example, metal duct carrying SAS 101 might be in contact with a hot component; such duct might essentially enclose the component in some embodiments. SAS 101 flows through a fan (not shown) of radiator 406, further gathering heat from surfaces carrying engine coolant therein. The radiator 406 fan helps to force SAS 101 through the system. After exiting radiator 406, SAS 101 enters air bypass 407, which may release expelled air 413, including a fraction (e.g., 0-30%) of dry system air 120, to the atmosphere. The air bypass 407 will be discussed in more detail in relation to FIGS. 6a and 6b. After air bypass 407, the remainder 470 of dry system air 120 enters air-to-air heat exchanger 408, where it is heated further by EAS 400 through radiation, conduction, and advection processes. The dry system air 120 is then ducted 471 to flow in close proximity to, and in thermal contact with, the hot muffler 409, gaining additional heat. Finally, before entering drying module 221, additional heat may be added to dry system air 120 by an electrical heater 410, to reach a desired target temperature. SAS 101 is forced through rotor 200 by system air blower 412.

Figure 8A:
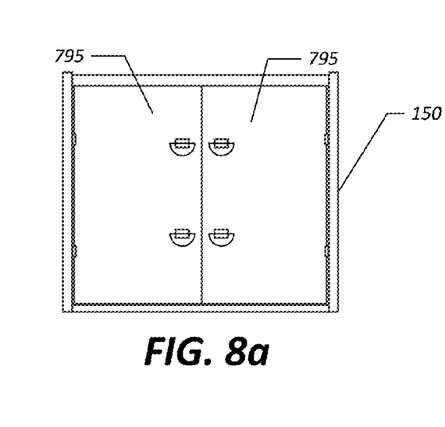
FIG. 8a shows a front view of the housing and of external interfaces of a waste heat recycling dehumidifier.
Figure 8B:
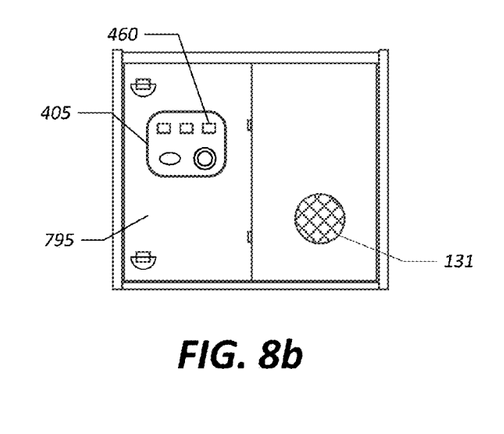
FIG. 8b shows a rear view of the housing and of external interfaces of a waste heat recycling dehumidifier.
Figure 8C:
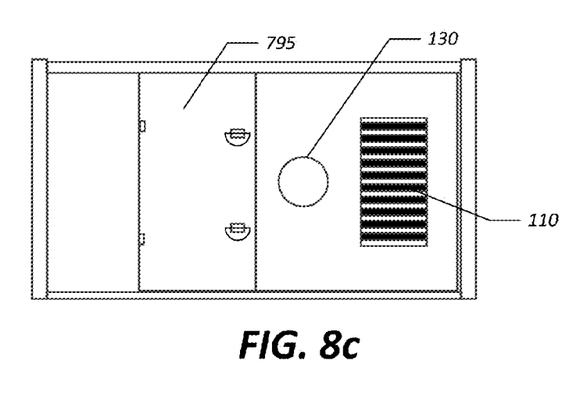
FIG. 8c shows a left side view of the housing and of external interfaces of a waste heat recycling dehumidifier.
Figure 8D:
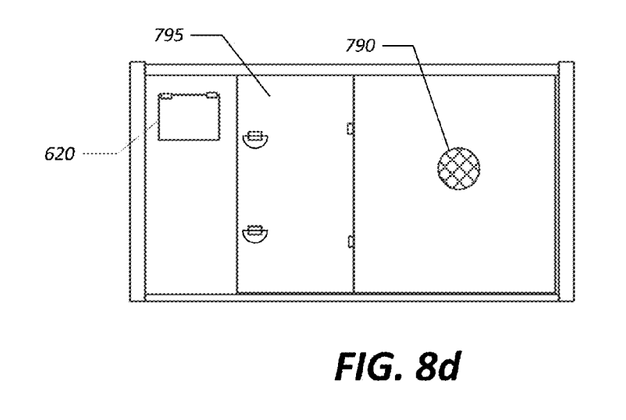
FIG. 8d shows a right side view of the housing and of external interfaces of a waste heat recycling dehumidifier.

Three specific sections of an exemplary route of EAS 400 are shown. Exhaust air is routed 400a from engine 404 to muffler 409. Because exhaust air exiting 400b the muffler 409 will be cooler than the SAS 101 after contact with the muffler 409 at muffler heat exchange area 482, air-to-air heat exchanger 408 is positioned upstream of the muffler 409. The sequence or order of interaction of SAS 101 with system components is chosen carefully, so that the temperature of SAS 101, and particular dry system air 120, is gradually ramped up. In the embodiment shown, EAS 400 flows out from the system through SAS outlet 111. In some embodiments, there may be a dedicated outlet for EAS 400, such as shown in FIG. 8d. Using a suboptimal ordering of contacts by dry system air 120 with system components may cause temperature of dry system air 120 to be reduced.

The amount of heat required from electrical heater 410 to reach the target temperature is greatly reduced because of reuse or recycling of heat from other components of heating module 220, which includes those portions of FIG. 4a followed by SAS 101 before entering drying module 221, where it encounters rotor 200.

FIG. 4a also illustrates possible uses of electricity produced by genAlt 403, including: controller 405 unit, which includes a user interface that receives user input and provides user output to control the system; electrical heater 410; rotor 200; system air blower 412; target air blower 230; and power outlet 460. Because of power outlet 460, which might include one or more electrical plugs, the system may function as an electrical generator, either in addition to, or in lieu of, its dehumidifying function. In a situation where the system is transported to a foreign country that has different electrical output standards (e.g., different plug configurations or different voltages) from the home country, a plug might be configured to provide electricity to the home country's standards, so that other emergency equipment from the home country can operate in the foreign country immediately without adaption.

Note that one or more plugs may be disabled. If any of the plugs are enabled, then electrical power available for the electrical heater 410 might be reduced, possibly slowing the drying process somewhat.

Figure 4B:
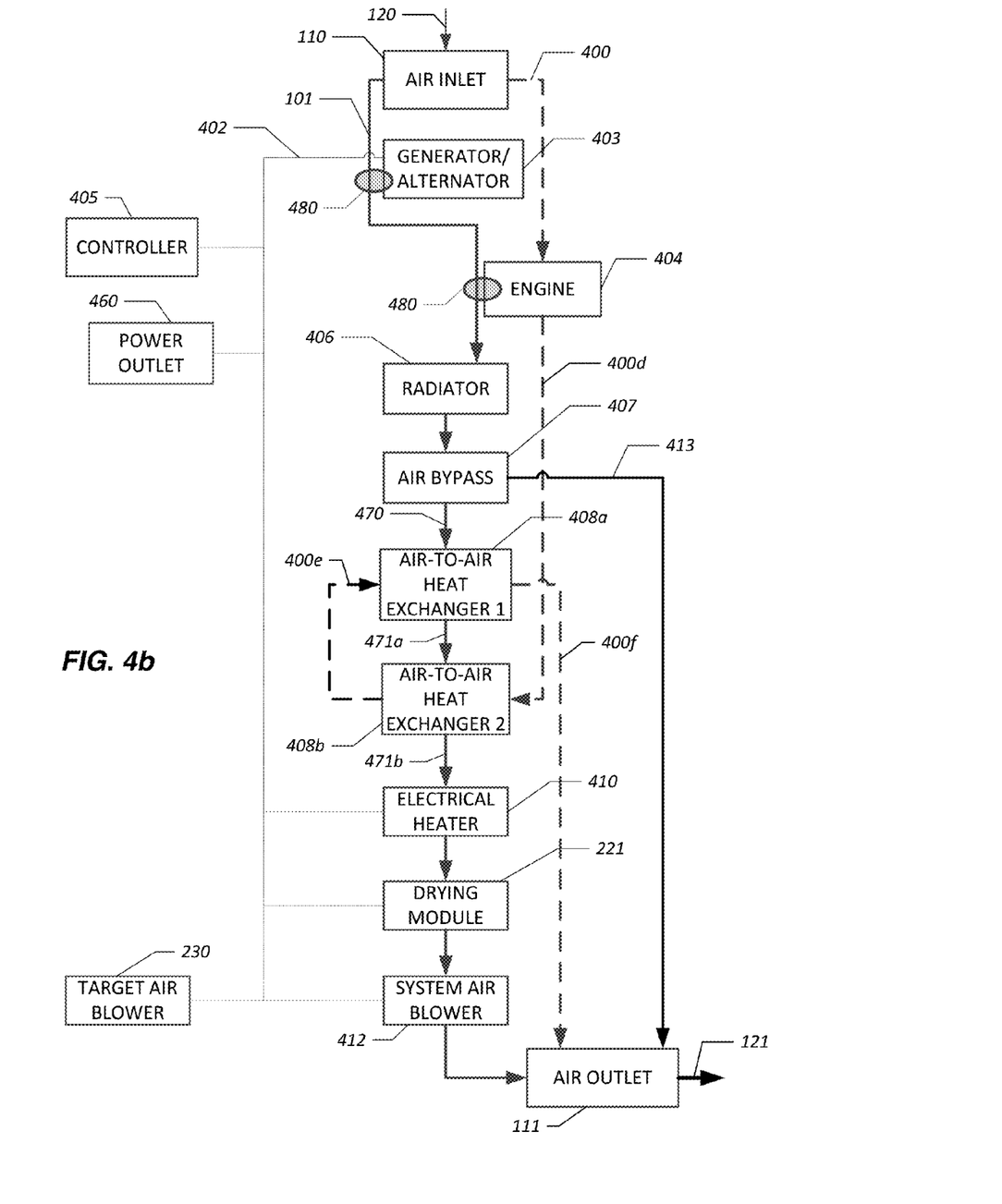
FIG. 4b is a block diagram illustrating an exemplary path of the system air stream relative to components of another exemplary waste heat recycling dehumidifier.

FIG. 4b illustrates an alternative embodiment of SAS 101 and system components. The muffler 409 in this embodiment is replaced with a second air-to-air heat exchanger-2 408b. Note that air exiting 400e from air-to-air heat exchanger-2 408b will be hotter than that exiting 400f from air-to-air heat exchanger-1 408a, so air-to-air heat exchanger-2 408b is downstream of air-to-air heat exchanger-1 408a in SAS 101. SAS 101 moves 470 from air bypass 407 through air-to-air heat exchanger-1408a, then moves 471a from air-to-air heat exchanger-1 408a through air-to-air heat exchanger-2 408b, and then moves 471b into the electrical heater 410.

Figure 5:
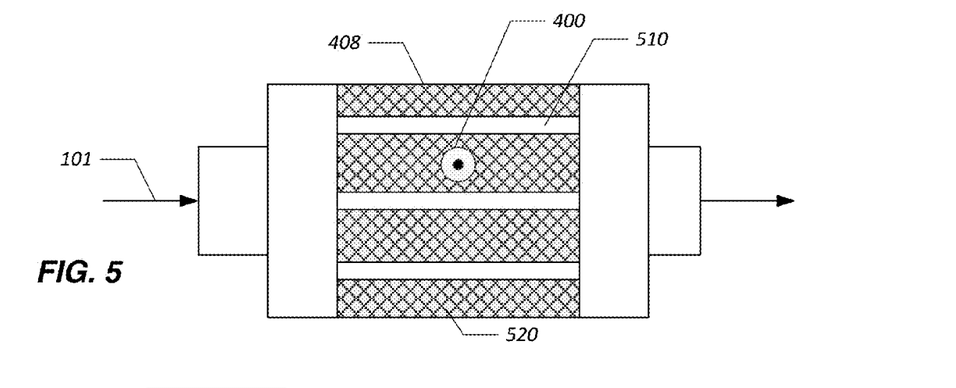
FIG. 5 is a conceptual diagram illustrating the function of an exemplary air-to-air heat exchanger, which transfers heat from the exhaust air stream to the system air stream.

FIG. 5 is a conceptual diagram illustrating the function of an exemplary air-to-air heat exchanger 408, which transfers heat from EAS 400 to SAS 101. As shown, SAS 101 enters from the left, flows through tubes 510, and out to the right. EAS 400 flows through air-to-air heat exchanger 408 in a direction perpendicular to SAS 101 flow. In the embodiment shown in FIG. 5, the EAS 400 flows through a grid 520, or mesh; in other embodiments, this flow might be through some other shape or form of air-permeable surface. In some embodiments, including the preferred embodiments, the paths through the air-to-air heat exchanger 408 of the two air streams might be interchanged, with EAS 400 flowing through tubes 510, and SAS 101 flowing through the permeable surface.

Under some conditions (e.g., in warm outdoor weather), engine 404 will require more air to be cooled by radiator 406 than is optimal for moisture removal at rotor 200. With the damper closed, about 30% of the heat reaches rotor 200 that would be otherwise lost to the outside. Some embodiments of air bypass 407 may simply dump a fixed fraction of SAS 101. In this case, air bypass 407 might be configured as a splitter of SAS 101. In more sophisticated embodiments, such as the one shown in FIG. 6a, the fraction (e.g. 0-30%) of the air dumped by air bypass 407 through bypass outlet 620 might be controlled by a bypass controller 610, based upon measurements from a temperature sensor 600 that reads temperature of engine 404, possibly from one of its surfaces or from engine coolant. The air bypass 407 may have a motorized damper to dump an amount of air chosen by bypass controller 610, or none at all. The bypass controller 610 may interact with users through a user interface, whereby a user can set one or more parameters that affect choices made by the bypass controller 610 with respect to whether the air bypass 407 is open or closed, and if open, what fraction of incoming air is dumped. Note that in FIG. 6a the bypass controller 610 is shown adjacent to the air bypass 407, but the bypass controller 610 might be located anywhere in the WHRD 100.

Figure 6B:
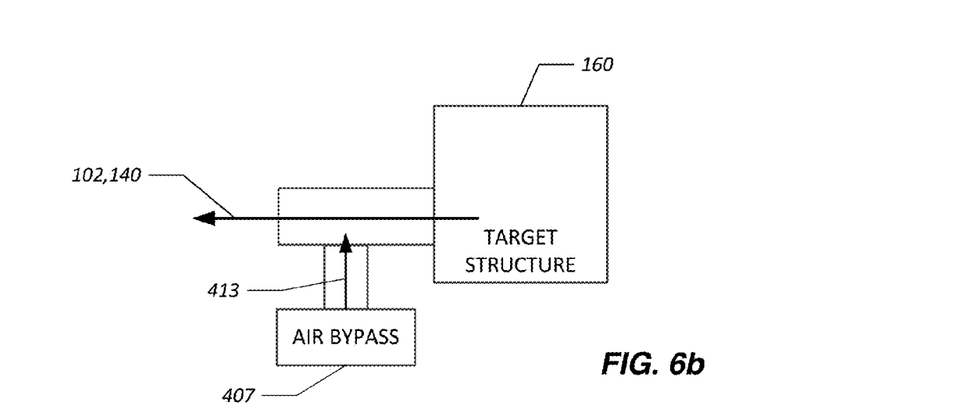
FIG. 6b is a block diagram illustrating use of air released from an air bypass to heat a target air stream.

FIG. 6b is an alternate embodiment in which expelled air from air bypass 407 is added to the TAS 102 to increase the temperature of the TAS 102, thereby hastening removal of moisture 103 from the TAS 102.

Recycling of heat from engine 404 and other components reduces the required engine 404 size, because less energy is required to drive electrical heater 410. The WHRD 100 is preferably driven by an internal combustion engine 404, which is powered by fossil fuel (e.g, diesel or gasoline), in the range of 20-200 HP, or any subrange thereof. The implementation shown in FIG. 8a-8d has a 44.7 HP engine 404, and consumes approximately 2 gallons of diesel per hour. A prior art electric regenerated desiccant dehumidifier that has the same air flow/drying rate/capacity would require a 165 HP, and consume about 8 gallon of fuel per hour, either diesel or gasoline.

Figure 7:
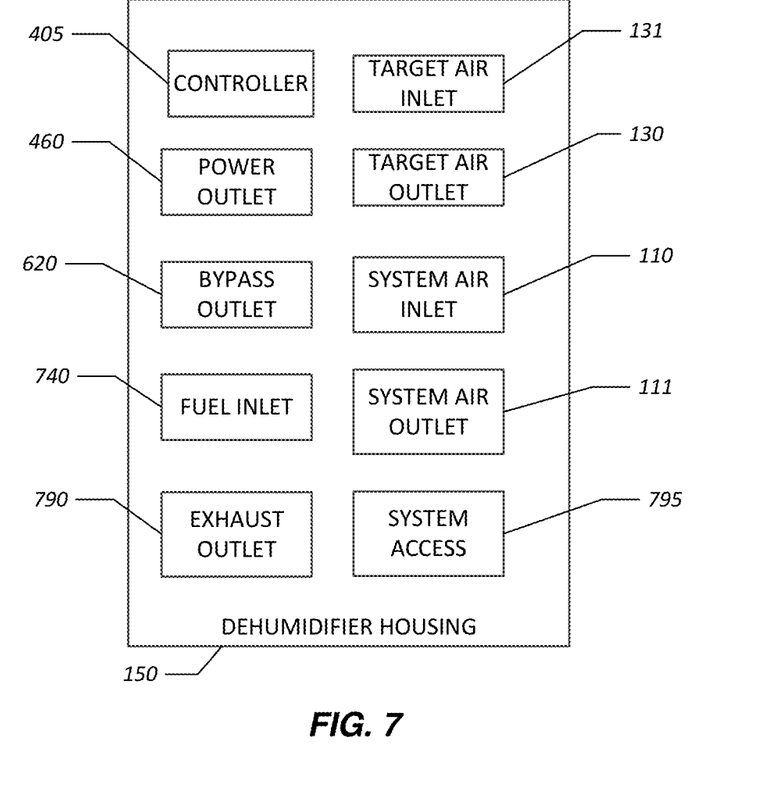
FIG. 7 is a block diagram illustrating exemplary external interfaces of an exemplary housing of a waste heat recycling dehumidifier.

The performance advantage achieved by a WHRD 100 may result in a significant reduction in the combined size of the components when compared to other dehumidifiers having similar capacity. Because of such size reduction, in some embodiments, a high capacity industrial WHRD 100 may be packaged in a housing 150 as an appliance, with a limited number of external interfaces. FIG. 7 lists some possible external interfaces. These include controller 405, whereby a user may set parameters of WHRD 100, and monitor its operation; TAS inlet 131; TAS outlet 130; SAS inlet 110; SAS outlet 111; bypass outlet 620, if separate from SAS outlet 111 in a particular embodiment; exhaust air stream outlet 790, if separate from SAS outlet 111 in a particular embodiment; system access 795 (e.g., a door, hood, or hatch) for repairs, modifications, or fueling the system; and/or a fuel inlet 740, allowing the user to provide diesel or gasoline for engine 404—as an alternative to fueling through system access 795. FIG. 8a-8d show front, rear, left side, and right side views, respectively, of a particular embodiment of an operational WHRD 100 and its external interfaces.

Figure 9:
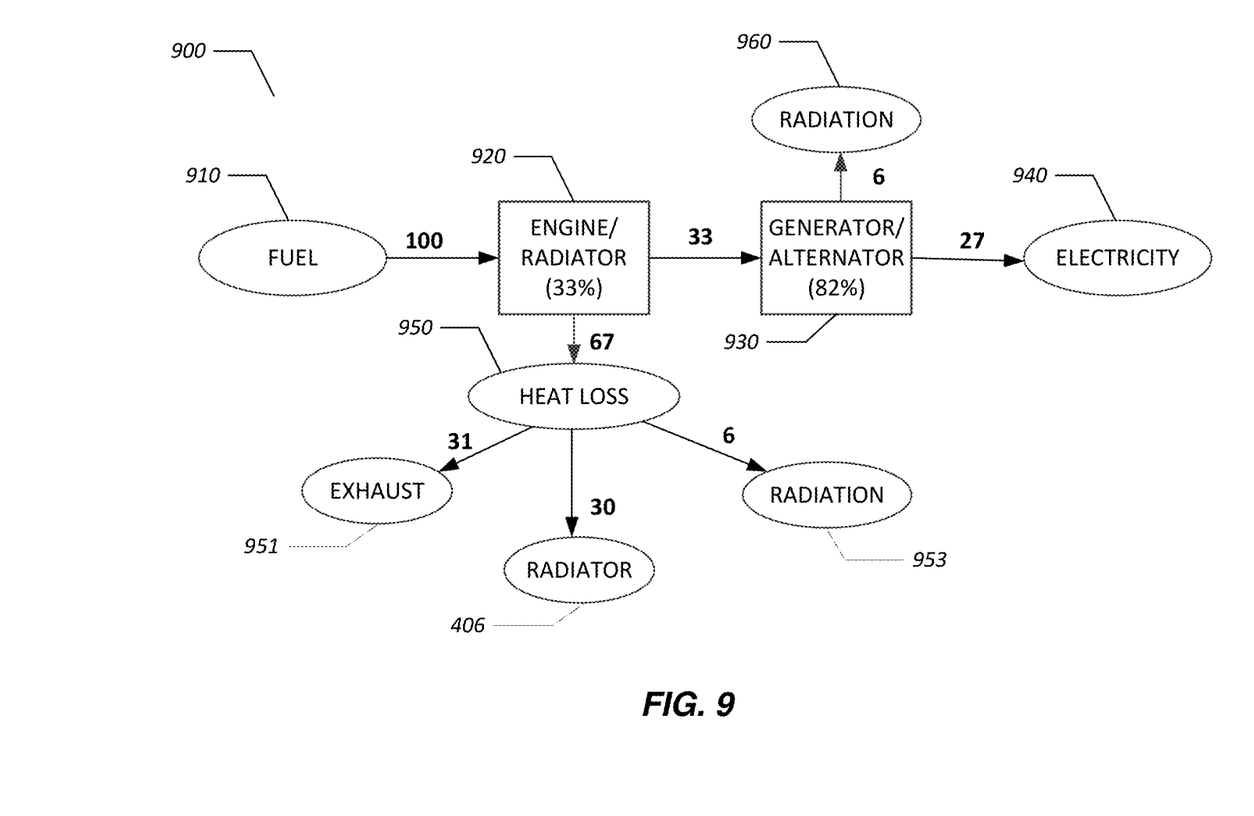
FIG. 9 is an energy budget illustrating heat that would be lost by components of a more conventional dehumidifier, much of which is recaptured by the configuration of a waste heat recycling dehumidifier.

FIG. 9 is an energy budget 900, illustrating heat that would be lost by components of a prior art dehumidifier, much of which is recaptured by the configuration of a WHRD 100. Assume that from 910, 100 units of energy are provided to the system. Typical energy flows are shown as amounts on arrows (representing percentages of the input fuel energy) between elements of FIG. 9. Efficiencies are shown parenthetically within elements where applicable. The engine/radiator 920 combination is about 33% efficient, so 33 units of energy are transferred to generator/alternator 930. Because generator/alternator 930 is about 82% efficient, 27 units of electricity 940 are produced to drive electrical heater 410 and other electrical components. About 67 units of energy are lost 950 to heat by engine/radiator 920 combination, of which 31 units go out as exhaust 450, 30 units are lost to coolant in radiator 406, and 6 units are radiated as heat by engine 404 housing. Another 6 units are lost 960 by genAlt 403 to 953. Eliminating much of this waste, the drying capacity of an exemplary WHRD 100, which consumes about 2 gallons of diesel per hour, at ANSI/AHAM DH-1 Section 7 (dry bulb temperature 80 F; wet bulb temperature 69.6 F; relative humidity 60%) is approximately 1406 liters per day.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. An apparatus, comprising:
a) a system air blower, which forces a system air stream from a system air inlet through a ducting system, then out through a system air outlet;
b) a heating module, including
 (i) an engine, which burns fuel to create mechanical energy, and which produces an exhaust air stream,
 (ii) a generator or an alternator, which produces electrical energy from mechanical energy of the engine;
c) the ducting system, which routes the system air stream into thermal contact with the exhaust air stream, with a radiator, and with surfaces of the engine and of the generator or the alternator, thereby heating the system air stream prior to entry of the system air stream into a drying module;
d) a target air blower, which forces a target air stream from a target air inlet through the drying module, then out through a target air outlet; and
e) the drying module, wherein moisture is transferred from the target air stream to the system air stream.

2. The apparatus of claim 1, wherein the drying module includes:
 (i) a first chamber, through which the target air stream passes,
 (ii) a second chamber, through which the system air stream passes, and
 (iii) a rotor, which
  (A) contains desiccant that adsorbs or absorbs moisture from the target air stream, and
  (B) transfers the desiccant into the system air stream, where moisture is removed from the desiccant.

3. The apparatus of claim 1, wherein the target air stream enters the target air inlet from a building, and the target air stream exits the target air outlet into the building.

4. The apparatus of claim 1, the heating module further including
 (iii) a first air-to-air heat exchanger through which the target air stream flows.

5. The apparatus of claim 4, the heating module further including
 (iv) a muffler,
wherein the target air stream is routed through the first air-to-air heat exchanger, then in thermal contact with the muffler, and an exhaust air stream containing engine exhaust is routed through the muffler and then through the first air-to-air heat exchanger, thereby warming the target air stream.

6. The apparatus of claim 4, the heating module further including
 (iv) a second air-to-air heat exchanger,
wherein the target air stream is routed through the first air-to-air heat exchanger, then through the second air-to-air heat exchanger, and an exhaust air stream containing engine exhaust is routed through the second air-to-air heat exchanger and then through the first air-to-air heat exchanger, thereby warming the target air stream.

7. The apparatus of claim 1, the heating module further including
 (iii) an electric heater that heats the system air stream prior to entry of the system air stream into the drying module.

8. The apparatus of claim 1, the heating module further including
 (iii) an air bypass, which has a first configuration whereby all air of the system air stream that enters the air bypass continues beyond the air bypass within the system air stream, and a second configuration whereby a nonzero fraction of the air of the system air stream that enters the air bypass is diverted into an expelled air stream.

9. The apparatus of claim 8, wherein the expelled air stream is merged into the target air stream.

10. The apparatus of claim 8, wherein the system air stream flows through a radiator, then through the air bypass, and then into an air-to-air heat exchanger.

11. The apparatus of claim 8, the heating module further including
 (iv) a sensor that measures temperature of the engine, the temperature determining whether the air bypass is in the first configuration or the second configuration.

12. The apparatus of claim 11, the heating module further including
 (iv) a controller that receives temperature measurements from the sensor, sets the configuration of the air bypass, and when the air bypass is in the second configuration sets the fraction of diverted air.

13. The apparatus of claim 12, further comprising:
f) a user interface, through which the controller receives a value of a parameter that affects how temperature measurements from the sensor correspond to settings of the air bypass.

14. The apparatus of claim 11, wherein the temperature is an engine surface temperature.

15. The apparatus of claim 11, wherein the temperature is an engine coolant temperature.

16. The apparatus of claim 1, wherein the ducting system routes the system air stream through the apparatus in the following relative order:
 (i) through ducting in thermal contact with a generator or alternator,
 (ii) through ducting in thermal contact with the engine,
 (iii) through a radiator,
 (iv) through an air bypass having a first and a second configuration, wherein in the first configuration a nonzero fraction of the air is diverted from the system air stream,
 (v) through an air-to-air heat exchanger where the system air stream is heated by engine exhaust,
 (vi) through ducting in thermal contact with a muffler, or through a second air-to-air heat exchanger where the system air stream is heated by an exhaust air stream,
 (vii) through an electric heater, and
 (viii) into the drying module.

17. The apparatus of claim 1, wherein the ducting system routes an exhaust air stream from the engine through the apparatus in the following relative order:
 (i) through a muffler,
 (ii) through an air-to-air heat exchanger, where the exhaust air stream heats the system air stream, and (iii) through an air outlet that removes the exhaust air from the apparatus.

18. The apparatus of claim 1, further comprising:

f) a housing that encloses the system air blower, the heating module, the ducting system, the target air blower, and the drying module.

19. The apparatus of claim 18, further comprising:

g) an electrical outlet on the surface of the housing that is powered by the generator or the alternator.

20. A method, comprising:

a) forcing a system air stream from a system air inlet through a ducting system;

b) routing the system air stream into thermal contact with an exhaust air stream, with a radiator, and with surfaces of an engine and of a generator or an alternator, thereby heating the system air stream prior to entry of the system air stream into a drying module;

c) forcing a target air stream from a target air inlet into the drying module;

d) in the drying module, transferring moisture from the target air stream into the system air stream; and e) forcing the system air stream out through a system air outlet.

21. The method of claim 20, further comprising:

f) passing the system air stream and the exhaust air stream through an air-to-air heat exchanger, whereby heat is transferred from the exhaust air stream to the system air stream.

22. The method of claim 21, further comprising:

g) upon sensing an engine temperature in a specified range, opening an air bypass to expel a nonzero fraction of air from the system air stream.

23. The method of claim 22, further comprising:

h) routing the system air stream into thermal contact with a muffler.

* * * * *